United States Patent [19]

Kühn et al.

[11] Patent Number: 4,599,483

[45] Date of Patent: Jul. 8, 1986

[54] SIGNAL CABLE

[75] Inventors: Volker Kühn; Thomas Kühn, both of Malsch, Fed. Rep. of Germany

[73] Assignee: Audioplan Renate Kuhn, Malsch, Fed. Rep. of Germany

[21] Appl. No.: 660,090

[22] Filed: Oct. 12, 1984

[30] Foreign Application Priority Data

Oct. 14, 1983 [DE] Fed. Rep. of Germany ....... 3337432

[51] Int. Cl.⁴ ................................................ H02B 7/34

[52] U.S. Cl. ........................................ 174/36; 174/34; 174/103; 339/29 R; 339/177 R

[58] Field of Search .................... 174/35 SM, 36, 103, 174/105 R, 32, 34, 114 R; 123/633; 333/1, 243, 236; 307/91; 339/148, 177 R, 28, 29 R

[56] References Cited

U.S. PATENT DOCUMENTS

| | | | |
|---|---|---|---|
| 2,047,152 | 7/1936 | Mitchell | 123/633 |
| 2,109,334 | 2/1938 | Kaden et al. | 174/36 |
| 2,145,092 | 1/1939 | Mitchell | 174/105 R |
| 2,243,851 | 6/1941 | Booth et al. | 174/36 |
| 2,440,290 | 4/1948 | Pickles | 333/1 |
| 3,683,103 | 8/1972 | Mancino | 174/126 CP X |
| 3,692,924 | 9/1972 | Nye | 174/126 CP X |
| 4,079,192 | 3/1978 | Josse | 174/126 CP |
| 4,445,745 | 5/1984 | Cartesse | 339/177 R |

FOREIGN PATENT DOCUMENTS

| | | | |
|---|---|---|---|
| 211486 | 2/1908 | Fed. Rep. of Germany | 174/103 |

*Primary Examiner*—Arthur T. Grimley
*Assistant Examiner*—Morris H. Nimmo
*Attorney, Agent, or Firm*—Antonelli, Terry & Wands

[57] ABSTRACT

In order to improve the transmission characteristics and to prevent distortions, a signal cable with two juxtaposed insulated conductors with connecting elements is proposed, in which each conductor is surrounded by its own coaxial individual screen and the screens are insulated against the connecting elements. The conductors and the individual screens are jointly surrounded by an insulated overall screen, which is electrically connected to at least one of the connecting elements.

9 Claims, 4 Drawing Figures

SIGNAL CABLE

BACKGROUND OF THE INVENTION

The invention relates to a signal cable, such as an amplifier cable, with two juxtaposed, insulated conductors with connecting elements.

The invention more particularly relates to a signal cable, such as occurs during the transmission of musical signals between the components of a musical installation. Apart from such phono-cables, the invention also relates to cables for transmitting digital signals, e.g. in data communications.

Conventionally, signal cables comprise those having a common shielding or screening of both conductors by a screen-grid lead surrounding the same and which is electrically connected to one of the single conductors at the connecting element.

In addition, attempts have also already been made to use coaxial cables, in which one single conductor is a stranded wire and the other single conductor is a coaxial screen surrounding the same. Finally, attempts have been made to arrange two cross-sectionally annular lines coaxially to one another in order to in this way improve the transmission characteristics of such a cable. However, generally an improvement with respect to one parameter leads to a deterioration with respect to other parameters, so that in general with known cables it is always necessary to take account of certain disadvantages, which can be accepted if they are not so important.

SUMMARY OF THE INVENTION

The problem of the invention is to develop a signal cable of the aforementioned type in such a way that it has much better transmission characteristics than known cables and in particular prevents parasitic, magnetic and/or capacitive couplings of the two single conductors with the resulting disadvantageous pulse delays and the resulting distortions, together with external interference and the influence thereof on the single conductors and the signals transmitted by them.

According to the invention, this problem is solved in that each conductor is surrounded by its own coaxial individual screen, which is insulated therefrom and against one another, whilst said individual screens are also insulated against the connecting elements. As a result of the construction according to the invention, the parallel single conductors are shielded against external interference. There is simultaneously a reciprocal shielding of the single conductors, as well as a reduction in the overall capacitance of the cable, so that there is also a reduction in the reciprocal influencing of the signal-carrying single conductors. It is not only important that the single conductors are in each case screened with respect to the outside and one another by the individual screens, but also that the individual screens are not electrically connected to the connecting elements and in particular not with a single conductor and are instead electrically insulated in all respects. As a result of the construction according to the invention, on the one hand inductive influences prejudicial to undisturbed signal transmission are avoided and on the other hand a series arrangement of capacitances is obtained with a resulting reduction of the overall capacitance.

According to a preferred development of the invention, the conductors and the individual screens are jointly surrounded by an insulated overall screen. In per se known manner, it can be provided that the overall screen, but not the individual screens, is electrically connected to one of the connecting elements. According to another development, the individual screens are constructed as bare, tin-coated copper meshes and/or the conductors are silver-coated. Fundamentally, the complete screen could be constructed as a bare or tin-coated copper mesh, but according to a preferred development, the overall screen is constructed as a silver-coated copper mesh. Particularly in the case where the single conductors have a considerable thickness, e.g. having a cross-section exceeding 0.5 $mm^2$, they advantageously comprise individual, insulated stranded wires, which are preferably individually silver-coated. It is possible to have insulation of a fluorocarbon material, such as PTFE, FEP or PFA.

BRIEF DESCRIPTION OF THE DRAWINGS

The invention is described in greater detail hereinafter relative to an embodiment of a cable according to the invention and with reference to the drawings, wherein show.

DETAILED DESCRIPTION OF THE INVENTION

Figure 1:
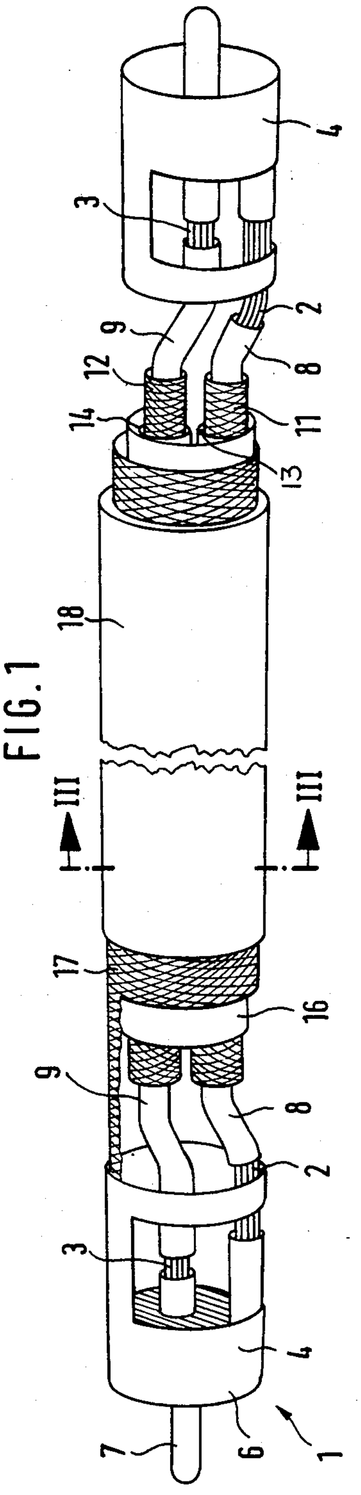
FIG. 1 a side view of a preferred development of the cable according to the invention, with partly broken away parts.
Figure 2:
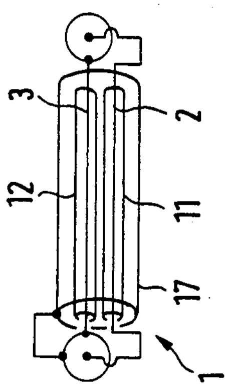
FIG. 2 a diagrammatic view of the individual, non-insulating elements of the cable according to FIG. 1.
Figure 4:
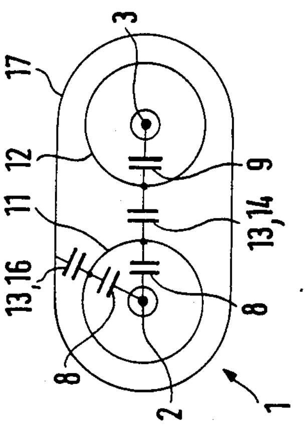
FIG. 4 a diagrammatic view of the section of FIG. 3.
Figure 3:
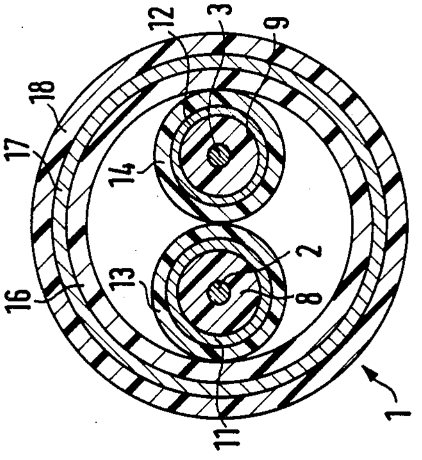
FIG. 3 a section along line III—III of FIG. 1.

The signal cable 1 according to the invention has two single conductors 2, 3. At their ends, conductors 2, 3 are connected to connecting elements 4 in the form of plugs, conductor 2 being connected electrically to a plug socket 6 and conductor 3 to a guide pin 7 insulated against socket 6.

Single conductors 2, 3 can e.g. comprise silver-coated copper stranded wires. If the single conductors 2, 3 have larger cross-sections, e.g. above 0.5 $mm^2$, it is advantageous to construct the conductors with individually insulated stranded wires, the latter e.g. having a PTFE-insulation.

Each of the conductors 2, 3 is surrounded by an insulating sheath 8, 9 and in each case an individual screen 11, 12 of an electrical conductive screening network is arranged around the latter and coaxially to conductors 2, 3. Each individual screen 11, 12 is surrounded by an insulating sheath 13, 14. To this extent, the construction of each single conductor arrangement 2, 8, 11, 13 or 3, 9, 12, 14 corresponds to a coaxial cable. However, whereas in the case of a coaxial cable, both the internal conductor (here e.g. 3) and the screening network (here e.g. 12) and one terminal of a connector is connected, according to the invention the individual screens 11, 12 terminate upstream of connecting elements 4 and are insulated with respect thereto, instead of being connected thereto.

Both single conductor arrangements 2, 8, 11, 13 and 3, 9, 12, 14 are arranged in the represented embodiment in a common, insulating internal sheath 16, which for electrical reasons is not necessary in the case of the represented embodiment of the signal cable 1 according to the invention, because each single conductor arrangement is insulated by sheaths 13, 14, but preference is given to the use thereof for mechanical reasons. Internal sheath 16 is coaxially surrounded by an overall screen 17 in the form of a conductive screening network. Externally thereof is connected an external insulating sheath 18, which insulates with respect to the outside the complete signal cable. The overall screen 17 is electrically connected with at least one of the connecting elements 4 and with one of the terminals 6 or 7, in the represented embodiment with plug sockets 6.

The signal cable according to the invention provides not only an optimum shielding of external influences, but in particular also reduces the reciprocal influencing of the signal-carrying conductors, which in the case of known signal cables leads to interference, distortions, etc. The advantages according to the invention are in particular achieved in that the screens 11, 12 are not incorporated into the electrical conduction process and are instead insulated against the connecting elements and merely fulfil screening functions. Apart from its use in the musical field, the cable according to the invention is also suitable for data communications uses, because delay distortions and the like are minimized.

The features of the invention disclosed in the above description, the drawings and in the claims can be essential for the realisation of the invention, either singly, or in random combinations.

What is claimed is:

1. A signal cable, such as an amplifier cable, comprising two juxtaposed insulated conductors with associated connecting elements, wherein each conductor is individually surrounded by a coaxial screen which is electrically insulated from its associated conductor, and each screen being electrically insulated with respect to one another and from the connecting elements.

2. A signal cable according to claim 1, wherein the conductors and the individual screens are jointly surrounded by an insulated overall screen.

3. A signal cable according to claim 2, wherein the overall screen is electrically connected to at least one of the connecting elements.

4. A signal cable according to claim 2, wherein the overall screen is electrically connected to both connecting elements.

5. A signal cable according to one of the preceding claims, wherein the individual screens are constructed as bare or tin-coated copper meshes.

6. A signal cable according to claim 2, wherein the overall screen is constructed as a silver-coated copper mesh.

7. A signal cable according to claim 1, wherein the conductors are silver-coated.

8. A signal cable according to claim 1, whrein the conductors comprise individual insulated stranded wires.

9. A signal cable according to claim 8, wherein the individual insulation of the stranded wires comprises a fluorocarbon material.

* * * * *